United States Patent
Jang et al.

(10) Patent No.: US 9,463,800 B2
(45) Date of Patent: Oct. 11, 2016

(54) CONTROL METHOD FOR MOTOR-DRIVEN VEHICLE AND CONTROL SYSTEM THEREOF

(71) Applicant: HYUNDAI MOTOR COMPANY, Seoul (KR)

(72) Inventors: Do-Youn Jang, Seoul (KR); Deok-Keun Shin, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 29 days.

(21) Appl. No.: 14/561,023

(22) Filed: Dec. 4, 2014

(65) Prior Publication Data

US 2016/0082969 A1  Mar. 24, 2016

(30) Foreign Application Priority Data

Sep. 22, 2014 (KR) .................. 10-2014-0125855

(51) Int. Cl.
*B60W 10/08* (2006.01)
*B60W 30/18* (2012.01)
(Continued)

(52) U.S. Cl.
CPC ....... *B60W 30/18118* (2013.01); *B60L 3/0076* (2013.01); *B60L 3/12* (2013.01); *B60T 7/122* (2013.01); *B60T 8/17* (2013.01); *B60T 8/885* (2013.01); *B60W 10/182* (2013.01); *B60L 2240/12* (2013.01); *B60L 2240/421* (2013.01);
(Continued)

(58) Field of Classification Search
CPC .................. B60W 30/188118; B60W 10/182; B60W 10/08; B60T 7/122; B60L 3/0076; Y10T 477/24; Y10T 477/363; Y10T 477/393; Y10T 477/82

USPC ................... 701/22; 477/4, 23, 29, 901, 188
See application file for complete search history.

(56) References Cited

U.S. PATENT DOCUMENTS 6,278,916 B1 *  8/2001  Crombez .................. B60L 7/26
                                                        180/197
6,321,144 B1 * 11/2001  Crombez ............ B60L 15/2009
                                                        303/152
(Continued)

FOREIGN PATENT DOCUMENTS

JP  2001-177905 A  6/2001
JP  2008-054433 A  3/2008
(Continued)

OTHER PUBLICATIONS

English translation of KR100726547 (from IDS); translationportal.epo.org; Feb. 24, 2016.*
(Continued)

*Primary Examiner* — Roger Pang
(74) *Attorney, Agent, or Firm* — McDermott Will & Emery LLP

(57) ABSTRACT

A control method for a motor-driven vehicle includes comparing a motor output with a hill holding condition on an inclined road. A hill holding fail safe is performed through a brake cooperation control when the motor output is less than the hill holding condition. Since the brake cooperation control for the hill holding fail safe is implemented by an electronic parking brake (EPB) motor control on a hill holding condition, convenience is provided without difficulty of control according to an oil pressure.

11 Claims, 5 Drawing Sheets

(51) Int. Cl.
  *B60T 8/17* (2006.01)
  *B60L 3/00* (2006.01)
  *B60W 10/18* (2012.01)
  *B60T 7/12* (2006.01)
  *B60L 3/12* (2006.01)
  *B60T 8/88* (2006.01)

(52) U.S. Cl.
  CPC ..... *B60L 2240/423* (2013.01); *B60L 2240/525* (2013.01); *B60L 2240/642* (2013.01); *B60T 2201/06* (2013.01); *B60T 2270/402* (2013.01); *B60W 10/08* (2013.01); *Y10T 477/24* (2015.01); *Y10T 477/363* (2015.01); *Y10T 477/393* (2015.01); *Y10T 477/82* (2015.01)

(56) References Cited

U.S. PATENT DOCUMENTS

| | | | | |
|---|---|---|---|---|
| 7,828,694 B2 * | 11/2010 | Silveri | ............... | B60K 6/485 290/40 C |
| 8,876,658 B2 * | 11/2014 | Kazama | ............. | B60L 15/2081 180/65.285 |
| 2002/0116101 A1 * | 8/2002 | Hashiba | ................. | B60K 6/48 701/22 |
| 2003/0132664 A1 * | 7/2003 | Grand | .................... | B60T 1/10 303/20 |
| 2005/0017580 A1 | 1/2005 | Cikanek et al. | | |
| 2005/0143877 A1 * | 6/2005 | Cikanek | ................ | B60K 6/46 701/22 |
| 2006/0069487 A1 * | 3/2006 | Sychra | ................... | B60K 6/46 701/69 |
| 2008/0318728 A1 * | 12/2008 | Soliman | ............... | B60K 6/445 477/4 |
| 2009/0145673 A1 * | 6/2009 | Soliman | ................ | B60K 6/442 180/65.1 |
| 2012/0185143 A1 * | 7/2012 | Ohno | ................... | B60L 3/0061 701/99 |
| 2013/0085631 A1 * | 4/2013 | Kim | .................. | B60L 15/2081 701/22 |
| 2013/0296112 A1 | 11/2013 | Yamazaki et al. | | |

FOREIGN PATENT DOCUMENTS

| | | |
|---|---|---|
| JP | 2013-129364 A | 7/2013 |
| KR | 20040100036 A * | 12/2004 |
| KR | 10-0726547 B1 | 6/2007 |
| KR | 10-1021129 B1 | 1/2010 |
| KR | 10-0980079 B1 | 9/2010 |
| KR | 10-2012-0121312 A | 11/2012 |
| KR | 10-2013-0142347 A | 12/2013 |
| KR | 10-1406179 B1 | 6/2014 |

OTHER PUBLICATIONS

English translation of KR20040100036A; translationportal.epo.org; Feb. 24, 2016.*

* cited by examiner

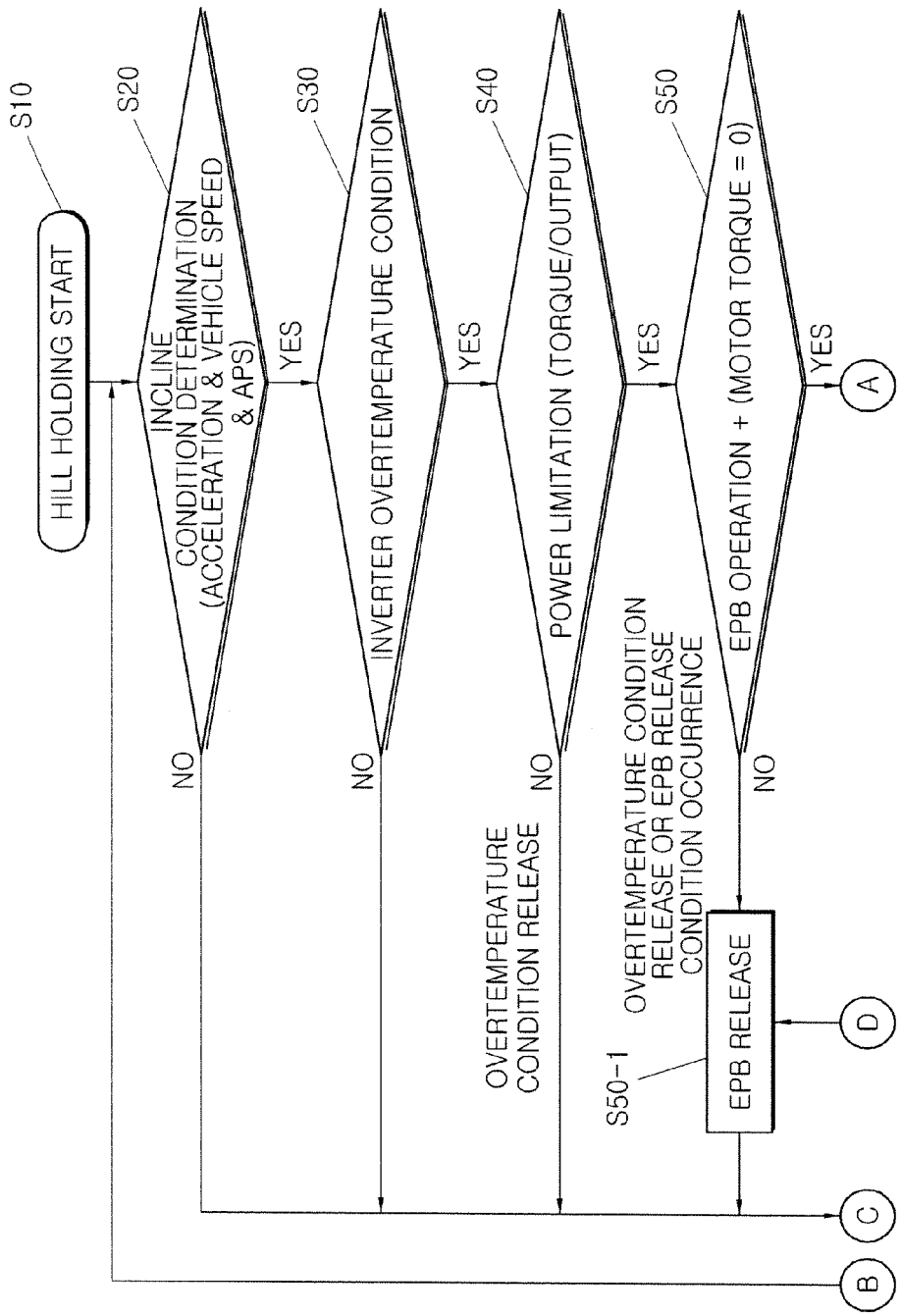

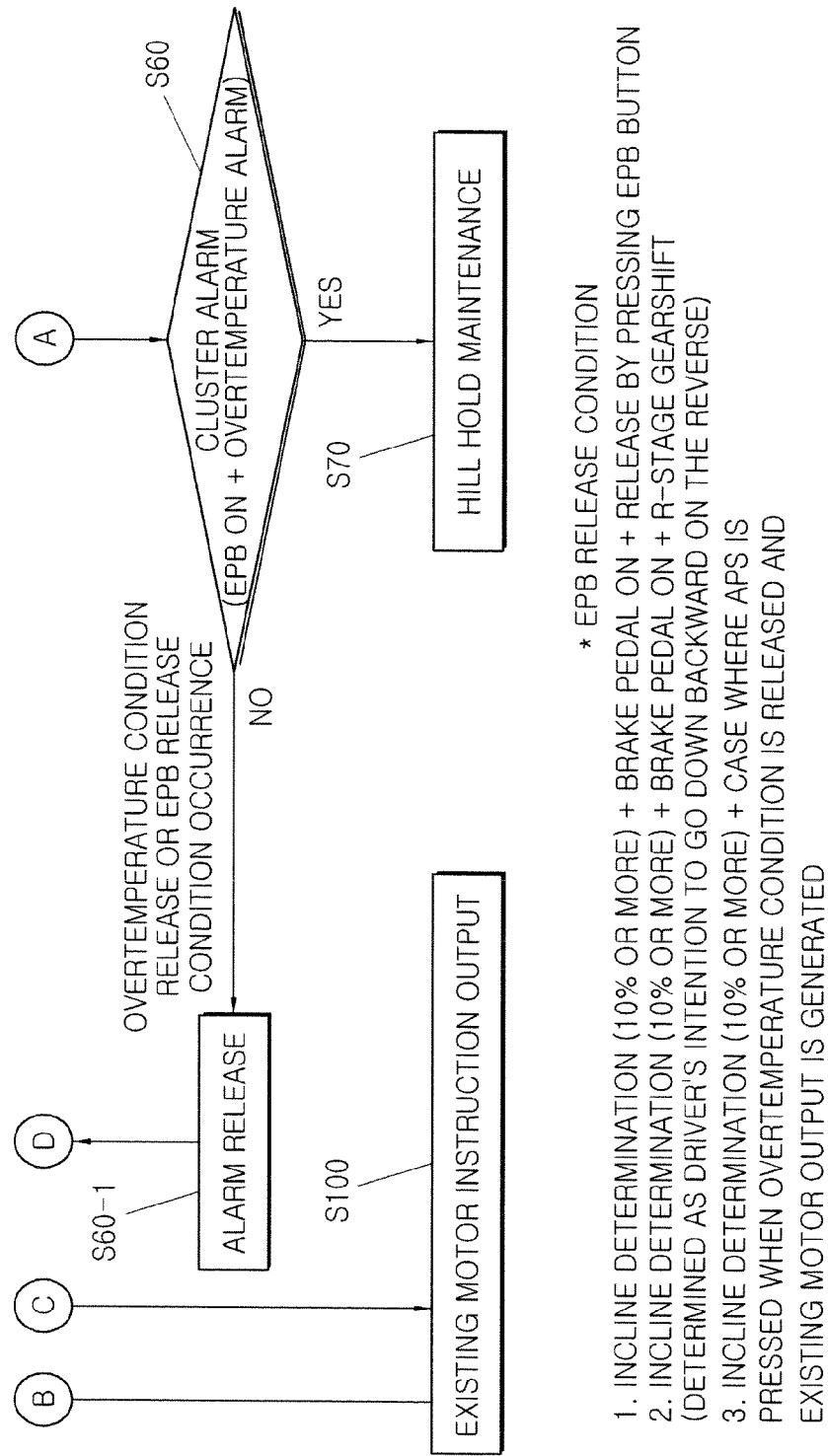

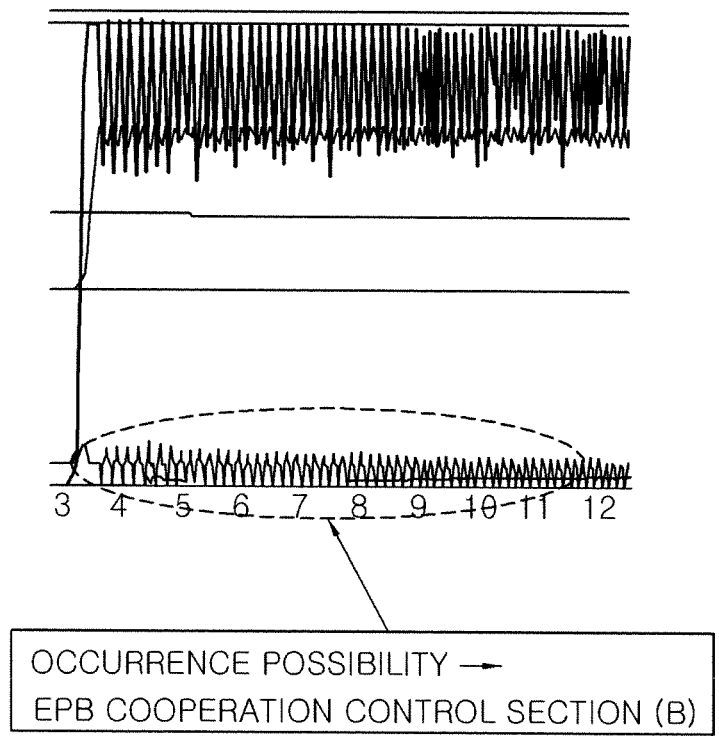

CONTROL METHOD FOR MOTOR-DRIVEN VEHICLE AND CONTROL SYSTEM THEREOF

CROSS-REFERENCE(S) TO RELATED APPLICATIONS

This application claims the benefit of priority to Korean Patent Application No. 10-2014-0125855, filed on Sep. 22, 2014, which is incorporated herein by reference in its entirety.

TECHNICAL FIELD

The present disclosure relates to control for a motor-driven vehicle, and more particularly, to a method and system for controlling a motor-driven vehicle for preventing the vehicle from rolling backward through a brake cooperation control.

BACKGROUND

Since a motor-driven vehicle, i.e., an electric vehicle (EV) does not have an engine system, a power of the vehicle is controlled by a motor and an inverter. Particularly, the electric vehicle may cause an element temperature increase in an insulated gate bipolar transistor (IGBT) in the inside of an inverter during current/output use, and such a temperature increase in the IGBT may cause damage to power electric (PE) components. Here, the PE components mean a motor inverter using a power of a high-voltage battery and the like.

For this reason, an output is limited during current/output use in the inverter, thereby restraining a temperature of the IGBT from increasing. However, the output limitation of the inverter is unavoidable to have a rather negative aspect that output derating occurs, with a positive aspect that the temperature of the IGBT is restrained from increasing.

Specifically, when an electric vehicle is maintained in a hill holding state in an excessive uphill area over 30%, the output derating may not meet an output requested by a driver for hill holding maintenance, and may show a result of continuously reducing the output. For this reason, it is difficult for an electric vehicle to be maintained in a hill holding state, unlike a driver's intention, and a sudden torque/output drop which may occur in such a state may make the electric vehicle roll backward and thus may cause an unpredicted danger.

However, a brake cooperation control scheme of using oil pressure on the hill holding of an electric vehicle in an uphill area must take the reactivity of the oil pressure into consideration, and particularly, must solve the difficulty of having to overcome characteristics of the oil pressure, which is difficult in controlling a reaction speed and a request amount rather than a motor torque output speed.

SUMMARY

The present disclosure is directed to a method and system for controlling a motor-driven vehicle. A hill holding fail safe for preventing an electric vehicle from rolling backward by a sudden torque/output drop is implemented by implementing a brake cooperation control by an electronic parking brake (EPB) on a hill holding condition where the output derating of an inverter occurs. The brake cooperation control for the hill holding fail safe on the hill holding condition is implemented by an EPB motor control, thereby having no difficulty of control according to the application of oil pressure, which is difficult in controlling a reaction speed and a request amount.

In accordance with an embodiment of the present inventive concept, a control method for a motor-driven vehicle includes comparing a motor output with a hill holding condition on an inclined road. A hill holding fail safe is performed through a brake cooperation control when the motor output is less than the hill holding condition.

The brake cooperation control is performed with an electronic parking brake.

In the step of comparing the motor output, a determination of the comparison with the hill holding condition may be performed with a condition of the inclined road, an over temperature condition of an inverter, and an output limitation condition of a driving motor.

An acceleration of the vehicle, a vehicle speed, and accelerator pedal scale (APS) detection may be applied to the condition of the inclined road.

The over temperature of the inverter may be a temperature at which a PE component of an insulated gate bipolar transistor (IGBT) is heat-damaged.

In the step of performing the hill holding fail safe, the brake cooperation control is interrupted when any one condition of a release condition of an inverter over temperature and a release condition of the EPB operation is satisfied. A release condition of the EPB operation may include a brake pedal switched on and an EPB button press signal on an inclined road of 10% or more. A brake pedal may be switched on and an R-stage gearshift signal on an inclined road of 10% or more.

The hill holding fail safe may include turning on a cluster lamp so that a driver can recognize an EPB operation state and an inverter over temperature state when the EPB operates. The cluster lamp is turned off when the operation of the EPB is interrupted. In accordance with another embodiment of the present inventive concept, a control system for a motor-driven vehicle may include an electronic parking brake (EPB) configured to generated a locking force to hold a wheel onto a driving motor or an actuator in a state where the vehicle stops by an adjustment of an EPB button. A motor control unit (MCU) is configured to check a signal of a brake pedal, a signal of an accelerator pedal, an R signal of a gearshift lever, a signal of the EPB button, an acceleration, a vehicle speed, and a temperature of an inverter, configured to operate the EPB to implement a hill holding fail safe on a hill holding condition, where possibility of occurrence of vehicle rattle or vehicle rolling exists, when it is necessary to limit an output of a driving motor of the vehicle as a result of the checking, and configured to turn on a cluster lamp so that a driver can recognize an EPB operation state and an inverter over temperature state when the EPB operates.

BRIEF DESCRIPTION OF THE DRAWINGS

FIGS. 1 and 2 are flowcharts for a hill holding fail safe of an electric vehicle in a control method for a motor-driven vehicle according to an embodiment of the present inventive concept.

FIGS. 3(A) and 3(B) are line graphs expressing the hill holding states of electric vehicles which are under mutually different incline conditions and are prevented from backward rolling by a hill holding fail safe control according to an embodiment of the present inventive concept.

DETAILED DESCRIPTION

Figure 3A:
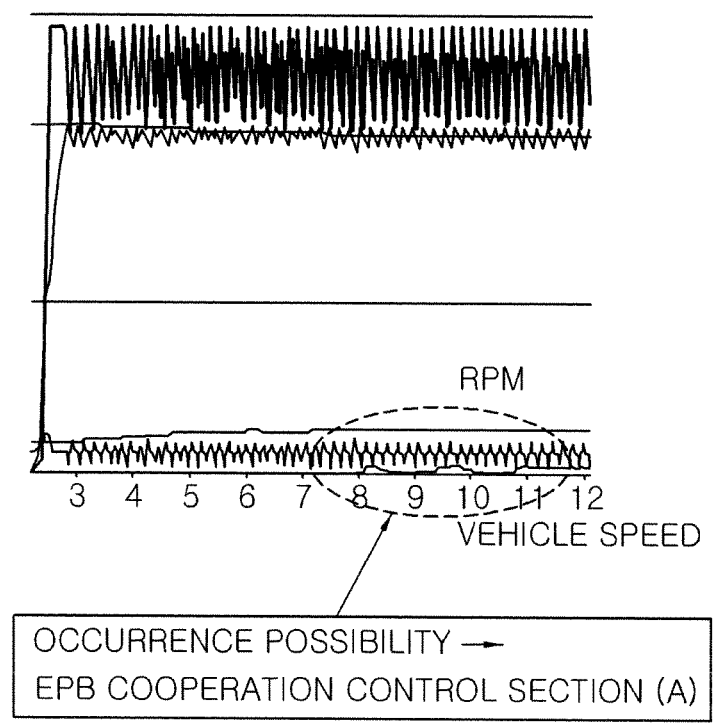

Exemplary embodiments of the present inventive concept will be described below in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present inventive concept.

FIGS. 1 and 2 show flowcharts for a hill holding fail safe of an electric vehicle in a control method for a motor-driven vehicle according to an embodiment of the present inventive concept.

As shown in FIGS. 1 and 2, a hill holding control of step S10 is divided into a hill holding maintenance of step S70 at which an electronic parking brake (EPB) cooperation control is performed, and an existing motor instruction output of step S100 at which an output of a driving motor is not limited. The division of the hill holding maintenance of step S70 and the existing motor instruction output of step S100 is determined depending on whether the hill holding state maintenance performance of the vehicle is sufficient. Various data of a vehicle which is in a hill holding state is used. Such a control is performed through a motor control unit (MCU), but may be performed through another controller included in an electric vehicle.

Specifically, the hill holding maintenance of step S70 is determined in such a manner as to first perform a vehicle condition determination procedure of steps S20, S30, and S40 before the determination, and then to perform the hill holding fail safe of step S50, at which an EPB cooperation brake control is performed, when the respective request conditions of steps S20, S30, and S40 are all satisfied. When step S50 is performed, an operation for a driver to recognize that the vehicle is in an EPB operation state is performed as shown at step S60. Particularly, the existing motor instruction output of step S100 is performed when any one of the respective request conditions of steps S20, S30, S40, S50, and S60 is not satisfied.

For example, the vehicle condition determination procedure of steps S20, S30, and S40 is sequentially applied in order of S20, S30, and S40, wherein the application is made as follows.

The check condition of step S20 determines an incline condition. To this end, an acceleration of the vehicle, a speed of the vehicle, detection of an accelerator pedal scale or accelerator pedal stroke (APS), or the like are applied. For example, the acceleration may have a set value of zero m/s$^2$ or more, the speed of the vehicle may have a set value of 2 KPH or more, and the APS detection may represent the operation state of an accelerator pedal. Here, the application of the acceleration having a set value of zero or more and the APS detection means that the vehicle movement intention of the driver, not rolling against the intention of the driver, is reflected on an inclined road.

Therefore, when a set condition, such as an acceleration of a predetermined value or more, a vehicle speed of a predetermined value or more, APS detection, or the like is not satisfied, the procedure immediately proceeds to step S100 at which an existing motor instruction output control scheme is maintained so that a driving motor cooperation brake control can be performed. In contrast, when the set conditions, including the acceleration of the predetermined value or more, the vehicle speed of the predetermined value or more, the APS detection, and the like are satisfied, the procedure immediately proceeds to step S30.

The check condition of step S30 pertains to an inverter over temperature condition, and is performed to prevent the vehicle from backward rolling due to a sudden torque/output drop which is caused by the output limitation performance of the inverter side for preventing the temperature increase of an insulated gate bipolar transistor (IGBT). In this case, since a temperature for determining an inverter over temperature varies depending on the type and performance of the inverter, the temperature is not determined to be a specific value, and is defined as a temperature at which the PE components of the IGBT are heat-damaged.

Therefore, when the inverter over temperature condition is not met, the procedure immediately proceeds to step S100 at which the existing motor instruction output control scheme is maintained so that the driving motor cooperation brake control can be performed. In contrast, when the inverter over temperature condition is met, the procedure immediately proceeds to step S40.

The check condition of step S40 limits power (torque or output), and is performed to prevent occurrence of a situation that the vehicle rolls backward, regardless of the driver's intention to go up or to hold, resulting from that torque is not enough to achieve hill hold on an inclined road due to the maximum torque or output limitation of the vehicle, which is caused by limiting the power of the vehicle when the inverter over temperature condition is met.

Therefore, when power is not limited, the procedure immediately proceeds to step S100 at which the existing motor instruction output control scheme is maintained so that the driving motor cooperation brake control can be performed. In contrast, when power is limited, the procedure immediately proceeds to step S50.

Step S50 represents a state in which the hill holding fail safe is performed, and pertains to a fail safe to ensure the safety of the driver by preventing the vehicle from backward rolling in a power limitation state. To this end, an EPB is used, so that the a wheel locking force of the EPB give help to a brake control force. In this case, the motor torque of a driving motor is shifted to zero.

On such a hill holding fail safe, an inverter over temperature release condition and an EPB operation release condition are continuously checked. When the inverter over temperature release condition and/or the EPB operation release condition is satisfied as a result of the checking, the EPB operation is stopped as shown at step S50-1, and the procedure immediately proceeds to step S100 at which a shift into the existing motor instruction output control scheme is performed so that the driving motor cooperation brake control can be performed.

In this case, the EPB operation release condition is variously subdivided as follows. A first EPB operation release condition includes an incline determination (10% or more), a brake pedal being in an On state, and an EPB button pressed (determination as a driver's intention to release the EPB operation). A second EPB operation release condition includes an incline determination (10% or more), a brake pedal being in an On state, and conversion into an R stage (determination as a driver's intention to go down backward on the reverse). A third EPB operation release condition includes an incline determination (10% or more), and either APS detection or driving motor output generation due to the inverter over temperature condition release.

In contrast, when both of the inverter over temperature release condition and the EPB operation release condition, checked on the hill holding fail safe, are not satisfied, the EPB operation is maintained, and the procedure proceeds to step S60 for notification performance at which an operation for the driver to recognize that an EPB is operating due to the over temperature of the inverter is performed. Then, in the EPB operation and the driver notification state, the hill holding maintenance state of step S70 is continued.

Specifically, even during the notification performance of step S60, the inverter over temperature release condition and the EPB operation release condition are continuously checked. When any one of the inverter over temperature release condition and the EPB operation release condition, applied at step S50, is satisfied as a result of the checking, the procedure proceeds to step S60-1 to release the notification to the driver, thereby releasing the maintenance of the hill holding. Thus, after the notification to the driver is released at step S60-1, the procedure proceeds to step S50-1 to stop the operation of the EPB, and then proceeds to step S100 at which a shift into the existing motor instruction output control scheme is performed so that the driving motor cooperation brake control can be performed.

The hill holding maintenance of step S70 and the hill holding state of the vehicle by the existing motor instruction output of step S100 are illustrated in FIGS. 3(A) and 3(B), divided into a "33% incline hill hold (A)" and a "40% incline hill hold (B)".

As shown in FIGS. 3(A) and 3(B), it can be understood that the possibility of the occurrence of vehicle rattle and vehicle rolling starts occurrence on the "33% incline hill hold (A)", and the possibility of the occurrence of vehicle rattle and vehicle rolling increases higher on the "40% incline hill hold (B)".

Therefore, the hill holding fail safe of step S50 performed on the "33% incline hill hold (A)" prevents the vehicle rattle and vehicle rolling from occurring by transitioning the occurrence possibility section of vehicle rattle and vehicle rolling to an "EPB cooperation control section (A)." In addition, the hill holding fail safe of step S50 performed on the "40% incline hill hold (B)" prevents the vehicle rattle and vehicle rolling from occurring by transitioning the occurrence possibility section of heavy vehicle rattle and vehicle rolling to an "EPB cooperation control section (B)".

Figure 4:
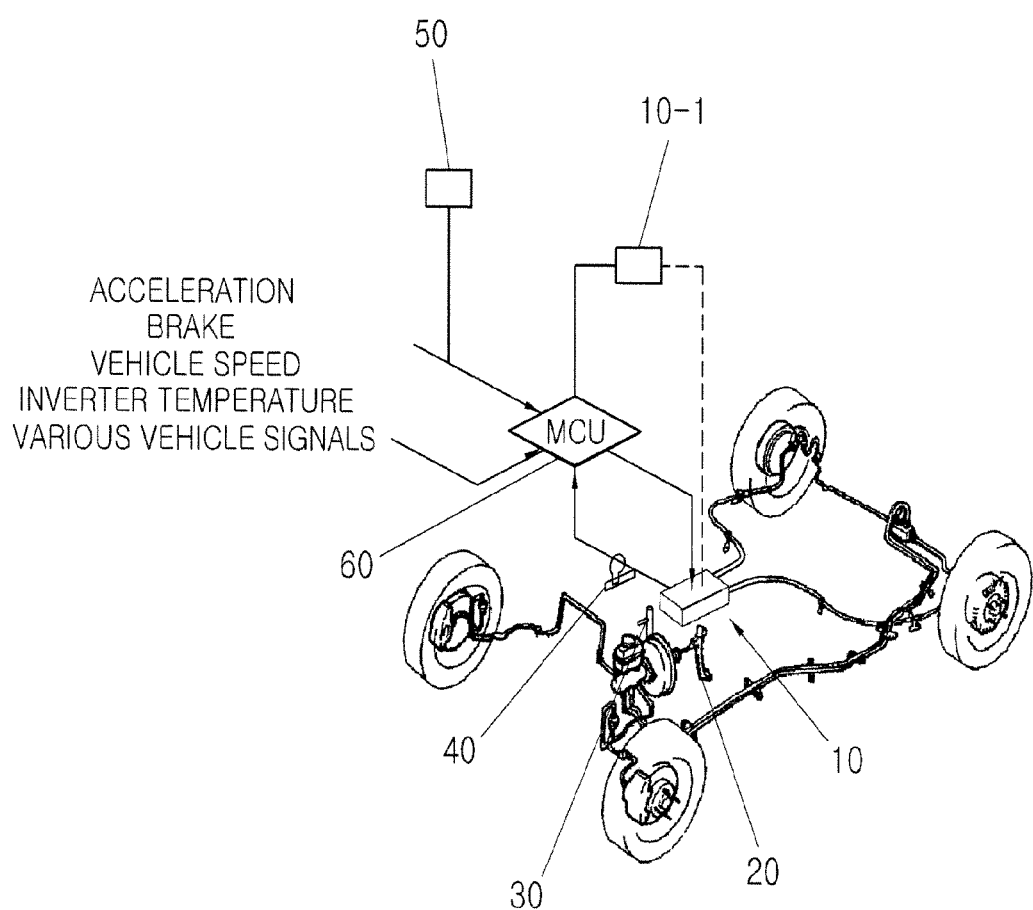
FIG. 4 is a view illustrating the configuration of a control system of a motor-driven vehicle according to an embodiment of the present inventive concept.

FIG. 4 is a view illustrating the configuration of a control system of a motor-driven vehicle according to an embodiment of the present inventive concept.

As shown in FIG. 4, the control system is a hill holding cooperation control system. The hill holding cooperation control system includes an EPB 10 having an on/off-type EPB button 10-1, a brake pedal 20 for braking, an accelerator pedal 30 for driving, a gearshift lever 40 for changing a driving speed, a cluster lamp 50 for notifying a driver whether or not the EPB 10 operates and whether or not an inverter is in an over temperature state, and an MCU 60 for operating the EPB 10 to implement the hill holding fail safe on a hill holding condition that the occurrence possibility of vehicle rattle and/or vehicle rolling exists.

The EPB means an electronic parking brake for generating a locking force to hold a wheel onto a motor or an actuator when an electric vehicle is parked. The brake pedal 20, the accelerator pedal 30, and the gearshift lever 40 mean a brake pedal, an accelerator pedal and a gearshift lever which are applied to the vehicle. The cluster lamp 50 is switched on or off according to the control of the MCU 60, is mounted on a dash board or a cluster forming a driver's seat, and includes a light emitting diode (LED).

The MCU 60 means a driving motor controller for generally controlling the vehicle, but may be configured with a dedicated controller for a hill holding cooperation control system which is mounted with an algorithm for performing a hill holding fail safe control.

Specifically, the MCU 60 is mounted with an algorithm for performing a hill holding fail safe control, described with reference to FIGS. 1 and 2, and thus operates the EPB 10 to implement a hill holding fail safe on a hill holding condition that the occurrence possibility of vehicle rattle and/or vehicle rolling exists. To this end, when implementing the hill holding fail safe, the MCU 60 checks the signal of the brake pedal 20, the signal of the accelerator pedal 30, the reverse (R) signal of the gearshift lever 40, an on/off signal of the EPB button 10-1, an acceleration, a vehicle speed, the temperature of an inverter, and the like, determines the checked information according to specific conditions, and then outputs a set control signal.

For example, the MCU 60 may check an APS signal, which is the signal of the accelerator pedal 30, together with an acceleration and a vehicle speed, compare and determine the checked signals with respect to set values, and then determine whether or not to implement a hill holding fail safe, which is a brake cooperation control by the operation of the EPB 10.

In addition, the MCU 60 checks the temperature of the inverter, and determines to implement or release the hill holding fail safe on the basis of an inverter over temperature condition.

In addition, the MCU 60 determines an incline with an acceleration, a vehicle speed, and an APS signal; checks the signal of the brake pedal 20, the reverse (R)-stage signal of the gearshift lever 40, and an off signal of the EPB button 10-1; and compares and determines the incline and checked data with respect to set conditions, thereby determining whether to implement or release the hill holding fail safe, which is a brake cooperation control by the operation of the EPB 10.

As described above, according to the hill holding fail safe control method applied to the control of a motor-driven vehicle in accordance with the embodiments of the present inventive concept, when the driving motor output of an electric vehicle stopped by braking on an inclined road is limited by the MCU 60, the motor power of the EPB 10 cooperates with the braking to perform the hill holding fail safe for preventing the electric vehicle from rolling backward, thereby implementing the hill holding fail safe for preventing the vehicle from rolling backward due to a sudden torque/output drop. Specifically, since the brake cooperation control for the hill holding fail safe is implemented by an EPB motor control on a hill holding condition, convenience is provided without difficulty of control according to the application of oil pressure, which is difficult in controlling a reaction speed and a request amount.

In accordance with the exemplary embodiments of the present inventive concept, on a hill holding condition where the output derating of an inverter occurs, a hill holding fail safe is implemented by a brake cooperation control of an EPB, so that an electric vehicle can be prevented from rolling backward by a sudden torque/output drop.

In addition, according to the exemplary embodiments of the present inventive concept, the brake cooperation control for the hill holding fail safe on the hill holding condition is implemented by an EPB motor control, it is possible to solve the difficulty of control according to the application of oil pressure, which is difficult in controlling a reaction speed and a request amount when the hill holding fail safe of the electric vehicle is implemented.

In addition, according to the exemplary embodiments of the present inventive concept, since the hill holding fail safe of the electric vehicle is implemented with only a simple control of controlling the output of the EPB motor according to the condition of an inclined road, the performance of the electric vehicle can be improved with little design change and little layout change.

While the present inventive concept has been described with respect to the specific embodiments, it will be apparent to those skilled in the art that various changes and modifications may be made without departing from the spirit and scope of the invention as defined in the following claims.

What is claimed is:

1. A control method for a motor-driven vehicle comprising steps of:
    comparing a motor output with a hill holding condition on an inclined road; and
    performing a hill holding fail safe through a brake cooperation control when the motor output is less than the hill holding condition,
    wherein in the step of comparing the motor output with the hill holding condition, a determination of the comparison with the hill holding condition is performed with a condition of the incline road, an over temperature condition of an inverter, and an output limitation condition of a driving motor.

2. The method of claim 1, wherein the brake cooperation control is performed with an electronic parking brake when the motor output is less than the hill holding condition.

3. The method of claim 1, wherein an acceleration of the vehicle, a vehicle speed, and accelerator pedal scale (APS) detection are applied to the condition of the inclined road.

4. The method of claim 1, wherein the over temperature of the inverter is a temperature at which a power electric (PE) component of an insulated gate bipolar transistor (IGBT) is heat-damaged.

5. The method of claim 1, wherein in the step of performing a hill holding fail safe through a brake cooperation control:
    the brake cooperation control is interrupted when any one condition of a release condition of an inverter over temperature and a release condition of the brake cooperation control is satisfied; and
    a release condition of an EPB operation includes a brake pedal switched on and an EPB button press signal on an inclined road of 10% or more.

6. The method of claim 1, wherein in the step of performing a hill holding fail safe through a brake cooperation control:
    the brake cooperation control is interrupted when any one condition of a release condition of an inverter over temperature and a release condition of the brake cooperation control is satisfied; and
    a release condition of the brake cooperation control includes a brake pedal switched on and an R-stage gearshift signal on an inclined road of 10% or more.

7. The method of claim 1, wherein the brake cooperation control is interrupted when any one condition of a release condition of an inverter over temperature and a release condition of the brake cooperation control is satisfied; and
    a release condition of the brake cooperation control includes detection of an accelerator pedal stroke (APS) or generation of a driving motor output due to the release condition of an inverter over temperature on an inclined road of 10% or more.

8. The method of claim 1, wherein in the step of performing the hill holding fail safe:
    when an operation of the brake cooperation control is performed, a cluster lamp is turned on such that a driver can recognize a brake cooperation control operation state and an inverter over temperature state; and
    when the operation of the brake cooperation control is interrupted, the cluster lamp is turned off.

9. The method of claim 8, wherein the interruption of the brake cooperation control operation is performed after an alarm is released by turning off the cluster lamp.

10. A control system for a motor-driven vehicle comprising:
    an electronic parking brake (EPB) configured to generate a locking force to hold a wheel onto a driving motor or an actuator when the vehicle is stopped by an adjustment of an EPB button; and
    a motor control unit (MCU) configured to check a signal of a brake pedal, a signal of an accelerator pedal, an R signal of a gearshift lever, a signal of the EPB button, an acceleration, a vehicle speed, and a temperature of an inverter, configured to operate the EPB to implement a hill holding fail safe on a hill holding condition, where possibility of occurrence of vehicle rattle or vehicle rolling exists, when it is necessary to limit an output of the driving motor of the vehicle as a result of the checking, and configured to turn on a cluster lamp so that a driver can recognize an EPB operation state and an inverter over temperature state when the EPB operates.

11. The system of claim 10, wherein the cluster lamp is a light emitting diode (LED) mounted on a cluster at a driver's seat side.

* * * * *